United States Patent
Mori et al.

(10) Patent No.: US 11,759,893 B2
(45) Date of Patent: Sep. 19, 2023

(54) ALUMINUM ALLOY FOR BRAZING AND ALUMINUM BRAZING SHEET

(71) Applicant: Mitsubishi Aluminum Co., Ltd., Minato-ku (JP)

(72) Inventors: Yoshiki Mori, Susono (JP); Hideyuki Miyake, Susono (JP); Michihide Yoshino, Susono (JP); Shohei Iwao, Sunto-gun (JP); Masakazu Edo, Susono (JP)

(73) Assignee: MA Aluminum Corporation, Minato-ku (JP)

( * ) Notice: Subject to any disclaimer, the term of this patent is extended or adjusted under 35 U.S.C. 154(b) by 60 days.

(21) Appl. No.: 17/424,300

(22) PCT Filed: Sep. 25, 2019

(86) PCT No.: PCT/JP2019/037644
§ 371 (c)(1),
(2) Date: Jul. 20, 2021

(87) PCT Pub. No.: WO2020/152911
PCT Pub. Date: Jul. 30, 2020

(65) Prior Publication Data
US 2022/0063024 A1   Mar. 3, 2022

(30) Foreign Application Priority Data
Jan. 23, 2019 (WO) .................. PCT/JP2019/002120

(51) Int. Cl.
*B23K 35/28* (2006.01)
*B23K 35/02* (2006.01)
(Continued)

(52) U.S. Cl.
CPC ........ *B23K 35/288* (2013.01); *B23K 35/0238* (2013.01); *B23K 35/286* (2013.01); *B32B 15/016* (2013.01); *C22C 21/02* (2013.01)

(58) Field of Classification Search
None
See application file for complete search history.

(56) References Cited

U.S. PATENT DOCUMENTS 11,007,609 B2 *  5/2021  Itoh .......................... C23F 13/14
11,020,824 B2 *  6/2021  Mori ....................... C22C 21/02
(Continued)

FOREIGN PATENT DOCUMENTS

| CN | 102251154 A | 11/2011 |
| CN | 104395028 A | 3/2015 |

(Continued)

OTHER PUBLICATIONS

Combined Chinese Office Action and Search Report dated Jan. 25, 2022 in Patent Application No. 201980089683.3 (with partial English language translation), 11 pages.

(Continued)

*Primary Examiner* — Daniel J. Schleis
(74) *Attorney, Agent, or Firm* — Oblon, McClelland, Maier & Neustadt, L.L.P.

(57) ABSTRACT

An aluminum alloy for flux-free brazing provided for brazing performed via an Al—Si-based brazing material without a flux in a non-oxidizing atmosphere without depressurization, includes: by mass %, 0.01% to 2.0% of Mg; and 0.005% to 1.5% of Bi, wherein in the aluminum alloy, there are more than 10 Mg—Bi-based compounds having a diameter of 0.01 μm or more and less than 5.0 μm in terms of equivalent circle diameter per 10,000-μm² visual field and there are less than 2 Mg—Bi-based compounds having a diameter of 5.0 μm or more per 10,000-μm² visual field in a (Continued)

cross section parallel to a rolling direction, and in the aluminum alloy, there are less than 5 Bi particles having a diameter of 5.0 μm or more in terms of equivalent circle diameter per 10,000-μm² visual field in the cross section parallel to the rolling direction.

17 Claims, 2 Drawing Sheets

(51) Int. Cl.
*B32B 15/01* (2006.01)
*C22C 21/02* (2006.01)

(56) References Cited

U.S. PATENT DOCUMENTS

| | | | |
|---|---|---|---|
| 11,027,373 B2 * | 6/2021 | Mori | B32B 15/016 |
| 11,045,911 B2 * | 6/2021 | Mori | B23K 35/0238 |
| 2017/0205160 A1 | 7/2017 | Yanagawa et al. | |
| 2018/0169798 A1 * | 6/2018 | Izumi | B23K 35/288 |

FOREIGN PATENT DOCUMENTS

| | | |
|---|---|---|
| CN | 104561698 A | 4/2015 |
| CN | 109070279 A | 12/2018 |
| CN | 106881511 B | 4/2019 |
| CN | 110691857 B | 12/2020 |
| JP | 8-120380 A | 5/1996 |
| JP | 8-120384 A | 5/1996 |
| JP | 8-120386 A | 5/1996 |
| JP | 2001-105174 A | 4/2001 |
| JP | 4547032 B1 | 9/2010 |
| JP | 2012-50992 A | 3/2012 |
| JP | 2014-37576 A | 2/2014 |
| JP | 2014-50861 A | 3/2014 |
| JP | 2018-103260 A | 7/2018 |
| JP | 6405020 B1 | 10/2018 |
| WO | WO 2018/216773 A1 | 11/2018 |

OTHER PUBLICATIONS

International Search Report dated Dec. 17, 2019 in PCT/JP2019/037644 filed on Sep. 25, 2019, 2 pages.
Combined Chinese Office Action and Search Report dated Aug. 20, 2020 in Patent Application No. 2019800020735 (with English language translation of Search Report only), 8 pages.
Extended European Search Report dated Oct. 5, 2022 in European Patent Application No. 19911474.5, 9 pages.

* cited by examiner

JOINT WIDTH EVALUATION POSITIONS

ALUMINUM ALLOY FOR BRAZING AND ALUMINUM BRAZING SHEET

CROSS-REFERENCE TO RELATED APPLICATIONS

The present application is a 35 U.S.C. § 371 national stage application of International patent application PCT/JP2019/037644, filed Sep. 25, 2019, which is based on and claims the benefit of priority to International patent application PCT/JP2019/002120, filed Jan. 23, 2019. The entire contents of these applications are incorporated herein by reference.

TECHNICAL FIELD

This invention relates to an aluminum alloy for flux-free brazing used for brazing without a flux and an aluminum brazing sheet for flux-free brazing.

BACKGROUND ART

As the size and weight of aluminum heat exchangers for vehicles such as radiators have been reduced, thinning and high-strengthening of aluminum materials have proceeded. In the manufacturing of aluminum heat exchangers, brazing is performed to join joints. However, in a brazing method using the current mainstream fluoride-based flux, the flux reacts with Mg in a material to be deactivated and is likely to cause brazing defects, so that the use of a Mg-added high strength member is limited. Therefore, a brazing method of joining a Mg-added aluminum alloy without using a flux is desired.

In flux-free brazing using an Al—Si—Mg brazing material, Mg in the brazing material that has been melted and activated reduces and decomposes an Al oxide film ($Al_2O_3$) on the surface of a joint, whereby joining is achieved. In a closed surface joint or the like, a good joined state is obtained at a joint where brazing sheets having brazing materials are combined by a decomposition action of an oxide film by Mg, and a joint where a brazing sheet and a member (bare material) to be joined which does not have a brazing material are combined.

CITATION LIST

Patent Literature

[Patent Literature 1]
Japanese Unexamined Patent Application. First Publication No. 2014-37576

SUMMARY OF INVENTION

Technical Problem

However, with a joint shape having an open portion that is easily affected by an atmosphere, a MgO film tends to grow on the surface of a Mg-added brazing material. Since the MgO film is a stable oxide film that is less likely to be decomposed, joining is significantly impeded. Therefore, a flux-free brazing method capable of obtaining a stable joined state at a joint having an open portion is strongly desired. For the above reason, as the Mg content in the brazing material alloy on the material surface is large and the oxygen concentration in a brazing furnace increases, the MgO film grows on the material surface in a brazing temperature rising process and a joined state tends to become unstable. In order to suppress the growth of the MgO film, it is effective to add no or a small amount of Mg to a brazing material alloy to be produced. However, since the amount of Mg that reduces and decomposes the Al oxide film ($Al_2O_3$) when the brazing material melts is insufficient, a technique in which Mg is added to a core material inside a brazing material and joining is enabled by Mg that diffuses into the brazing material in a brazing temperature rising process is disclosed (Patent Literature 1). However, even in a case using this technique, a MgO film grows on the surface of a molten braze and a joined state tends to become unstable.

The present invention has been made based on the above circumstances, and an object thereof is to provide an aluminum alloy for flux-free brazing capable of obtaining good joinability without a flux even with a joint shape having an open portion that is easily affected by an atmosphere, and a brazing sheet for flux-free brazing.

Solution to Problem

The present inventors found that by adding Mg and Bi to a single layer aluminum alloy used for flux-free brazing or a core material of a brazing sheet to disperse a Mg—Bi compound having a diameter of 0.01 to less than 5 μm in terms of equivalent circle diameter to a predetermined number density or more, the Mg—Bi compound is dissolved during braze heating, metal Bi is generated, and the generated Bi diffuses into the surface of a material and concentrates uniformly, whereby an oxide film has a structure that is easily altered, reduced, and decomposed and is mixed in a molten braze to reduce a surface tension, and thus good brazability is obtained. At this time, it was found that when a coarse Mg—Bi compound of 5 μm or more was generated during the manufacturing of the material, the number of fine Mg—Bi compounds decreases and the above effect is reduced. Furthermore, it was found that when solely Bi which is not compounded with Mg in the material before brazing and has an equivalent circle diameter of 5.0 μm or more is present at a number density of a certain level or more, although the solely Bi is dissolved in a low temperature range during braze heating and concentrates on the material surface, Bi is oxidized and deposited on the material surface until the brazing material melts, the oxide film becomes unstable at an early stage, and re-oxidation easily proceeds, whereby joining is impeded and it is difficult to obtain a good joined state.

That is, a first aspect of aluminum alloys for flux-free brazing according to the present invention including: by mass %, 0.01% to 2.0% of Mg; and 0.005% to 1.5% of Bi, wherein in the aluminum alloy, there are more than 10 Mg—Bi-based compounds having a diameter of 0.01 μm or more and less than 5.0 μm in terms of equivalent circle diameter per 10,000-μm$^2$ visual field and there are less than 2 Mg—Bi-based compounds having a diameter of 5.0 μm or more per 10,000-μm$^2$ visual field in a cross section parallel to a rolling direction, and in the aluminum alloy, there are less than 5 Bi particles having a diameter of 5.0 μm or more in terms of equivalent circle diameter per 10,000 μm$^2$ visual field in the cross section parallel to the rolling direction.

In an aluminum alloy for flux-free brazing of another aspect, in the present invention of the aspect, in the aluminum alloy, an atomic composition ratio between Mg and Bi is Mg/Bi=1.5 or more.

In an aluminum alloy for flux-free brazing of another aspect, in the present invention of the aspect, Ca content in the aluminum alloy is 100 ppm or less in terms of mass ppm.

In an aluminum alloy for flux-free brazing of another aspect, in the present invention of the aspect, the aluminum alloy further including, by mass %: one or more of Si: 0.05% to 1.2%, Mn: 0.1% to 2.5%, Cu: 0.01% to 2.5%, Fe: 0.05% to 1.5%, Zr: 0.01% to 0.3%, Ti: 0.01% to 0.3%, Cr: 0.01% to 0.5%, and Zn: 0.1% to 9.0%.

A first aspect of brazing sheets for flux-free brazing of the present invention has a multilayer structure in which at least one or more layers of the aluminum alloy according to any one of claims 1 to 4 are laminated, wherein an Al—Si-based brazing material is further laminated on one surface or both surfaces of the aluminum alloy to be located at an outermost surface.

In a brazing sheet for flux-free brazing of another aspect, in the invention of the aspect, the Al—Si-based brazing material includes, by mass %, Si: 1.5% to 14%, and further contains one or two or more of Mg: 0.01% to 2.0% and Bi: 0.005% to 1.5%.

In a brazing sheet for flux-free brazing of another aspect, in the invention of the aspect, Ca content in the Al—Si-based brazing material is 100 ppm or less in terms of mass ppm.

In a brazing sheet for flux-free brazing of another aspect, in the invention of the aspect, the Al—Si-based brazing material further includes 0.1% to 9.0% of Zn by mass %.

In an aluminum alloy for flux-free brazing of another aspect, in the invention of the aspect, in the Al—Si-based brazing material, a number of Si particles having a diameter of 1.75 μm or more in terms of equivalent circle diameter is 25% or more with respect to a number of the Si particles having a diameter of 0.8 μm or more in terms of equivalent circle diameter when observed in a surface layer plane direction.

In an aluminum alloy for flux-free brazing of another aspect, in the invention of the aspect, in the Al—Si-based brazing material, an area ratio of Si particles having a diameter of 1.75 μm or more in terms of equivalent circle diameter with respect to a surface area is in a range of 0.1% to 1.5%.

Hereinafter, the composition and the like specified in the present invention will be described below. In addition, contents described are shown in mass ratio.

Flux-Free Aluminum Alloy

A flux-free aluminum alloy used for a core material, a sacrificial material, or the like of a bare material or brazing sheet will be described below.

Mg: 0.01% to 2.0%

Mg partially diffuses on the surface of a material and reduces and decomposes an oxide film ($Al_2O_3$). In addition, Mg improves the strength of the material by precipitating as a compound with Si or the like. Furthermore, Mg improves corrosion resistance by strengthening the oxide film. However, when the Mg content is too small, the effect is insufficient. On the other hand, when Mg is excessively contained, not only be the effect saturated, but also the material becomes hard and brittle, making it difficult to manufacture the material. For these reasons, the Mg content is set to be in the above range. For the same reason, it is desirable that the Mg content is set to 0.05% at the lower limit and 1.5% at the upper limit.

Bi: 0.005% to 1.5%

Bi suppresses the growth of a dense oxide film of the material surface by partially diffusing into the material surface. In addition, Bi flows on the material surface and is mixed in a molten braze, thereby reducing the surface tension of the molten braze and improving the wet spreadability of the brazing material. However, when the Bi content is less than the lower limit, the effect is insufficient. On the other hand, when the Bi content is excessive, the effect is saturated, and Bi oxides are easily generated on the material surface, thereby impeding joining. For these reasons, the Bi content is set to be in the above range. For the same reason, it is desirable that the Bi content is set to 0.05% at the lower limit and 0.5% at the upper limit.

Si: 0.05% to 1.2%

Si has an effect of improving the material strength by being dissolved as a solid solution and also improving the material strength by precipitating as $Mg_2Si$ or an Al—Mn—Si compound, so that Si is added as desired. Furthermore, Si improves the pitting corrosion resistance of the material by precipitating as an intermetallic compound such as Al—Mn—Si and Al—Mn—Si—Fe and dispersing starting points of corrosion. However, when the Si content is too small, the effect becomes insufficient. On the other hand, when the Si content is excessive, the solidus temperature of the core material decreases and the core material melts during brazing. For these reasons, the Si content is set to be in the above range. For the same reason, it is desirable that the Si content is set to 0.3% at the lower limit and 1.0% at the upper limit. Even in a case where Si is not positively contained, Si may be contained as an unavoidable impurity, for example, in less than 0.05%.

Mn: 0.1% to 2.5%

Mn precipitates as an intermetallic compound and improves the material strength, so that Mn is contained as desired. Furthermore, Mn improves the pitting corrosion resistance of a clad material by precipitating as an intermetallic compound such as Al—Mn, Al—Mn—Si, Al—Mn—Fe, and Al—Mn—Si—Fe and dispersing starting points of corrosion. However, when the Mn content is too small, the effect is insufficient. On the other hand, when Mn is excessively contained, the material becomes hard, and material rollability decreases. For these reasons, the Mn content is set to be in the above range. For the same reason, it is desirable that the Mn content is set to 0.4% at the lower limit and 1.8% at the upper limit. Even in a case where Mn is not positively contained, Mn may be contained as an unavoidable impurity, for example, in less than 0.1%.

Cu: 0.01% to 2.5%

Cu is dissolved as a solid solution and improves the material strength, so that Cu is contained as desired. However, when the Cu content is excessively small, the effect is insufficient. On the other hand, when Cu is excessively contained, the solidus temperature of the core material decreases and the core material melts during brazing. For these reasons, the Cu content is set to be in the above range. For the same reason, it is desirable that the Cu content is set to 0.02% at the lower limit and 1.2% at the upper limit. Even in a case where Cu is not positively contained, Cu may be contained as an unavoidable impurity, for example, in less than 0.01%.

Fe: 0.05% to 1.0%

Fe precipitates as an intermetallic compound and improves the material strength, so that Fe is contained as desired. Furthermore, Fe promotes recrystallization during brazing and suppresses brazing erosion. In addition, Fe improves the pitting corrosion resistance of the material by precipitating as an intermetallic compound such as Al—Mn—Fe and Al—Mn—Si—Fe and dispersing starting points of corrosion. However, when the Fe content is less than the lower limit, the effect is insufficient. On the other hand, when the Fe content is excessive, a corrosion ratio after brazing becomes faster. For these reasons, the Fe content is set to be in the above range. For the same reason, it is desirable that the Fe content is set to 0.1% at the lower limit and 0.7% at the upper limit. Even in a case where Fe is not positively contained, Fe may be contained as an unavoidable impurity, for example, in less than 0.05%.

Zr: 0.01% to 0.3%

Zr forms a fine intermetallic compound and improves the material strength, so that Zr is contained as desired. In addition, Zr improves the pitting corrosion resistance of the material by precipitating as an Al—Zr-based intermetallic compound and dispersing starting points of corrosion, or by forming dark and light portions of solid solution Zr and making the form of corrosion into a layered form. However, when the Zr content is less than the lower limit, the effect is insufficient. On the other hand, when the Zr content is excessive, the material becomes hard and the workability deteriorates. For these reasons, the Zr content is set to be in the above range. For the same reason, it is desirable that the Zr content is set to 0.05% at the lower limit and 0.25% at the upper limit. Even in a case where Zr is not positively contained, Zr may be contained as an unavoidable impurity, for example, in less than 0.01%.

Ti: 0.01% to 0.3%

Ti forms a fine intermetallic compound and improves the material strength, so that Ti is contained as desired. In addition, Ti improves the pitting corrosion resistance of the material by precipitating as an Al—Ti-based intermetallic compound and dispersing starting points of corrosion, or by forming dark and light portions of solid solution Ti and making the form of corrosion into a layered form. However, when the Zr content is less than the lower limit, the effect is insufficient. On the other hand, when the Zr content is excessive, the material becomes hard and the workability deteriorates. For these reasons, the Ti content is set to be in the above range. For the same reason, it is desirable that the Ti content is set to 0.05% at the lower limit and 0.25% at the upper limit. Even in a case where Ti is not positively contained, Ti may be contained as an unavoidable impurity, for example, in less than 0.01%.

Cr. 0.01% to 0.5%

Cr forms a fine intermetallic compound and improves material strength, so that Cr is contained as desired. In addition, Cr improves the pitting corrosion resistance of the material by precipitating as an Al—Cr-based intermetallic compound and dispersing starting points of corrosion, or by forming dark and light portions of solid solution Cr and making the form of corrosion into a layered form. However, when the Zr content is less than the lower limit, the effect is insufficient. On the other hand, when the Zr content is excessive, the material becomes hard and the workability deteriorates. For these reasons, the Cr content is set to be in the above range. For the same reason, it is desirable that the Cr content is set to 0.1% at the lower limit and 0.4% at the upper limit. Even in a case where Cr is not positively contained, Cr may be contained as an unavoidable impurity, for example, in less than 0.01%.

Zn: 0.1% to 9.0%

Zn exhibits a sacrificial anticorrosive effect by making the pitting potential of the material lower than that of other members, so that Zn is contained as desired. However, when the Zn content is less than the lower limit, the effect is insufficient. On the other hand, when the Zn content is excessive, the effect is saturated, a corrosion consumption rate increases, and the corrosion resistance of the material is reduced by the loss of the material at an early stage. For these reasons, the Zn content is set to be in the above range. For the same reason, it is desirable that the Zn content is set to 1.0% at the lower limit and 8.0% at the upper limit. Even in a case where Zn is not positively contained, Zn may be contained as an unavoidable impurity, for example, in less than 0.1%.

Ca: 100 ppm or Less

Ca is usually contained as an unavoidable impurity at a few hundred ppm or less. However, the Ca content is desirably set to 100 ppm or less. Ca forms a high melting point compound with Bi and lowers the action of Bi is lowered, and the brazability becomes insufficient. Therefore, it is desirable to set the upper limit thereof. For the same reason, it is more desirable to set the Ca content to 10 ppm or less. Ca is an unavoidable impurity and may not be contained.

Mg—Bi-Based Compounds: Those Having a Diameter of 0.01 to Less than 5.0 μm in Terms of Equivalent Circle Diameter are More than 10 in Number Per 10,000-μm² Visual Field Dispersion of fine Mg—Bi-based compounds facilitates uniform concentration of Bi on the material surface when the compound melts in the brazing temperature rising process, and thus suppresses the growth of a dense oxide film. When the compounds are 10 or less in number, the effect of suppressing the dense oxide film becomes insufficient and the brazability is lowered. For the same reason, it is more desirable that the number thereof is 20 or more. The number of the Mg—Bi-based compounds in the aluminum alloy is obtained by subjecting a cross section of a prepared material parallel to a rolling direction to a mirror finish with 0.1-μm abrasive grains, performing fully automatic particle analysis using an electron beam microanalyzer (EPMA), producing a thin film by performing mechanical polishing and electrolytic polishing on the cross section of the cut material in order to measure fine compounds of 1 μm or less, observing the thin film with a transmission electron microscope (TEM), and counting the number of particles of the Mg—Bi-based compounds of 0.01 to 5.0 μm in an observation visual field of 10,000 μm² (100-μm square) in a surface direction. As means for finely and densely distributing the Mg—Bi-based compounds, adjustment can be achieved by appropriately combining, during casting, performing the casing at a high cooling rate from a high molten metal temperature, during hot rolling, taking a large total reduction rate of a certain level or more, taking a long rolling time in a high temperature range, reducing a hot rolling finish temperature by a certain level or more and increasing the subsequent cooling rate, and the like.

Mg—Bi-Based Compounds: Those Having a Diameter of 5.0 μm or More in Terms of Equivalent Circle Diameter are Less than 2 in Number Per 10,000-μm² Visual Field Coarse Mg—Bi-based compounds are difficult to melt during the brazing temperature rising process, and since Bi is difficult to concentrate uniformly on the material surface, the effect of suppressing the growth of the oxide film is low. In addition, as coarse compounds are generated, the generation of the fine Mg—Bi compounds of less than 5.0 μm is reduced. Therefore, the effect of suppressing the growth of the oxide film is reduced. The number of the Mg—Bi-based compounds on the surface of the brazing material can be obtained by the above-described fully automatic particle analysis using the EPMA. As means for suppressing the generation of the coarse Mg—Bi-based compounds, similarly to the above-described conditions, adjustment can be achieved by appropriately combining, during casting, performing the casing at a high cooling rate from a high molten metal temperature, during hot rolling, taking a large total reduction rate of a certain level or more, taking a long rolling time in a high temperature range, reducing a hot rolling finish temperature by a certain level or more and increasing the subsequent cooling rate, and the like.

Bi Particles: Those Having a Diameter of 5.0 µm or More in Terms of Equivalent Circle Diameter are Less than 5 in Number Per 10,000-µm² Visual Field When Bi particles are present in the material, the solely Bi melts from 271° C., which is the melting point of Bi, in the brazing temperature rising process and concentrates on the material surface. However, since the temperature is in a low temperature range in the brazing temperature rising process, Bi is oxidized and deposited on the material surface until the brazing material melts, the oxide film becomes unstable at an early stage, and re-oxidation easily proceeds, so that joining is impeded. Accordingly, it is difficult to obtain a good joined state. In addition, since Bi is consumed by oxidation, the effect of reducing the surface tension of the molten braze is reduced. At this time, it is possible to prevent these problems by producing the material so that the solely Bi is rarely present in the material before brazing. Specifically, by causing the Bi particles having a diameter of 5.0 µm or more in terms of equivalent circle diameter contained in the aluminum alloy to be less than 5 in number per 10,000-µm² visual field when observed in a cross section parallel to the rolling direction before brazing, Bi is rarely consumed by oxidation or the like, and the effect of improving the brazability by the addition of Bi is increased.

The number of Bi particles in the material can be obtained by subjecting the cross section of the produced material parallel to the rolling direction to a mirror finish with 0.1-µm abrasive grains, and performing fully automatic particle analysis thereon using an electron beam microanalyzer (EPMA). In addition, as means for suppressing the generation of Bi particles, adjustment can be achieved by appropriately combining the mixing ratio of Mg and Bi of an alloy, a molten metal temperature and a cooling rate during casting, and homogenization treatment conditions. As the molten metal temperature during the casting decreases and the cooling rate during the casting decreases, the number of Bi particles tends to increase. In addition, as the homogenization treatment conditions include a lower temperature and a shorter period of time, similarly, the number of Bi particles tends to increase.

Atomic Composition Ratio Between Mg and Bi (Mg/Bi): 1.5 or More

Satisfying the above atomic composition ratio suppresses the generation of solely Bi in the material and improves the brazability. Therefore, the above atomic composition ratio is obtained as desired. When the atomic composition ratio is less than 1.5, solely Bi is easily generated, and the brazability is reduced. For the same reason, it is desirable that the atomic composition ratio is 4.0 or more.

The element composition ratio between Mg and Bi is calculated by the method described below.

For example, in a case where the composition (content) of Mg in an aluminum alloy is 1.5 wt % and the composition (content) of Bi is 0.3 wt %, the value of wt % is divided by the atomic weight of the corresponding element and converted into a molar content.

Mg: 1.50/24.3=0.0617=A

Bi: 0.30/209=0.00144=B

Then, the element composition ratio is calculated by dividing one of the values converted into the molar contents by the other.

Element composition ratio Mg/Bi=A/B=0.0617/0.00144=42.8

Brazing Material

Next, components suitable for an Al—Si-based brazing material used for a bare material of the aluminum alloy or an Al—Si-based brazing material clad on the aluminum alloy will be described.

Si: 1.5% to 14%

Si forms a molten braze during brazing and forms a fillet at a joint. However, when the Si content is too small, the molten braze for forming the fillet is insufficient. On the other hand, when S is excessively contained, not only be the effect saturated, but also the material becomes hard and brittle, making it difficult to manufacture the material. Therefore, the S content is set to be in the above range. For the same reason, it is desirable that the Si content is set to 3.0% at the lower limit and 12% at the upper limit.

Mg: 0.01% to 2.0%

Mg reduces and decomposes an Al oxide film ($Al_2O_3$) and is thus contained as desired. However, when the Mg content is too small, the effect is insufficient. On the other hand, when the Mg is excessively contained, Mg reacts with oxygen in a brazing atmosphere and generates MgO that impedes joining, and the material becomes hard and brittle, making it difficult to manufacture the material. Therefore, the Mg content is set to be in the above range. For the same reason, it is desirable that the Mg content is set to 0.1% at the lower limit and 1.5% at the upper limit.

Bi: 0.005% to 1.5%

Bi suppresses the growth of a dense oxide film by concentrating on the surface of the material in a brazing temperature rising process, and furthermore, improves a gap filling property by reducing the surface tension of the molten braze, so that Bi is added as desired. However, when the Bi content is too small, the effect is insufficient. When the Bi content is excessive, not only be the effect saturated, but also Bi oxides are easily generated on the material surface, thereby impeding joining. For these reasons, it is desirable that the Bi content is set to be in the above range. For the same reason, it is more desirable that the Bi content is set to 0.05% at the lower limit and 0.5% at the upper limit.

Ca: 100 ppm or Less

Ca is usually contained as an unavoidable impurity at a few hundred ppm or less. However, since Ca forms a high melting point compound with Bi and lowers the action of Bi, it is desirable to limit the Ca content. When the Ca content exceeds 100 ppm, the action of Bi is lowered and the brazability becomes insufficient. Therefore, it is desirable to set the upper limit thereof to 100 ppm. For the same reason, it is more desirable to set the Ca content to 10 ppm or less.

Zn: 0.1% to 9.0%

Zn provides a sacrificial anticorrosive effect by lowering the potential of the material, and is therefore contained as desired. When the Zn content is too small, the sacrificial anticorrosive effect is insufficient. When the Zn content is excessive, the effect is saturated, the corrosion consumption rate increases, and the corrosion resistance of the material is reduced by the loss of the material at an early stage. For these reasons, it is desirable that the Zn content is set to be in the above range. For the same reason, it is more desirable that the Zn content is set to 0.5% at the lower limit and 7.0% at the upper limit. Even in a case where Zn is not positively added, Zn may be contained as an impurity in less than 0.1%.

In addition, the brazing material may contain, as other elements, one or more of 2.0% or less of each of In, Sn, and Mn, 1.0% or less of each of Fe, Ni, Ce, and Se, 0.3% or less of each of Be, Na, Sb, Ti, Zr, P, S, K, and Rb, and the like.

Distribution of Si Particles on Surface Layer Plane of Brazing Material (1) Among Si Particles Having Equivalent Circle Diameter of 0.8 μm or More, Number of Those Having Equivalent Circle Diameter of 1.75 μm is 25% or More In carrying out the present invention, it is preferable that relatively coarse Si particles are present on the surface of the brazing material. Usually, a dense oxide film such as $Al_2O_3$ is present on the surface of an aluminum material, and this further grows into a thick film in a brazing heat treatment process. The general view is that the greater the thickness of the oxide film, the stronger the tendency to impede a destructive action of the oxide film. In the present invention, since coarse Si particles are present on the surface of the brazing material, a dense oxide film of aluminum does not grow on the surface of the coarse Si particles, and this site acts as an oxide film defect on the surface of the aluminum material. That is, even if the oxide film on the surface of the aluminum material becomes a thick film during the brazing heat treatment, exudation or the like of the brazing material occurs from the Si particle parts, and the oxide film destruction action proceeds from these sites. The term "Si particles" mentioned here includes Si particles of a solely Si component in the composition, and also includes, for example, Fe—Si-based compounds and Al—Fe—Si-based intermetallic compounds primarily containing Fe—Si. In the description of the present invention, these are referred to as Si particles for convenience. Specifically, in a case where the Si particles on the surface of the brazing material are regarded as equivalent circle diameters and the number of Si particles of 0.8 μm or more is counted, when those of 1.75 μm or more are present in 25% or more, this effect is sufficiently obtained. Here, the surface of the brazing material means the surface of the aluminum alloy excluding the oxide film, and the above conditions may be satisfied in any planar direction in a depth range up to 10 μm. When the size of the Si particles on the surface of the brazing material is too small, the effect of acting as a defective portion of the oxide film becomes insufficient. Therefore, the number of Si particles of 1.75 μm or more is set to 25% or more of the number of Si particles of 0.8 μm or more. When the number thereof is less than 25%, the effect of acting as a defective portion of the oxide film becomes insufficient.

(2) Area Ratio of Si Particles Having Equivalent Circle Diameter of 1.75 μm or More to Surface Area is 0.1% to 1.5%

In a case where the distribution density of the Si particles is low, portions where exudation of the brazing material occurs are small in number, and the oxide film is not sufficiently broken or divided, so that it is difficult to obtain a stable joined state. In the present invention, by defining the area ratio of Si particles having an equivalent circle diameter of 1.75 μm or more, portions where exudation of the brazing material occurs are sufficiently secured. When the area ratio (surface area ratio of Si particles in the brazing material) to the surface area (the overall surface area of the brazing material) is less than the lower limit, joining starting points in joining surfaces are too small in number, and a sufficient joined state cannot be obtained. On the other hand, when the area ratio exceeds the upper limit, material side brazing erosion becomes significant in the coarse Si particle portions, which causes brazing defects. Therefore, the area ratio of the Si particles is set to be in the above range.

Atomic Composition Ratio Between Mg and Bi (Mg/Bi): 1.5 or More

Satisfying the above atomic composition ratio suppresses the generation of solely Bi in the brazing material and improves the brazability. Therefore, the above atomic composition ratio is obtained as desired. When the atomic composition ratio is less than 1.5, solely Bi is easily generated, and the brazability is reduced. For the same reason, it is desirable that the atomic composition ratio is 4.0 or more.

Advantageous Effects of Invention

According to the present invention, it is possible to perform good and stable braze joining without a flux in a non-oxidizing atmosphere.

DESCRIPTION OF EMBODIMENTS

Figure 1:
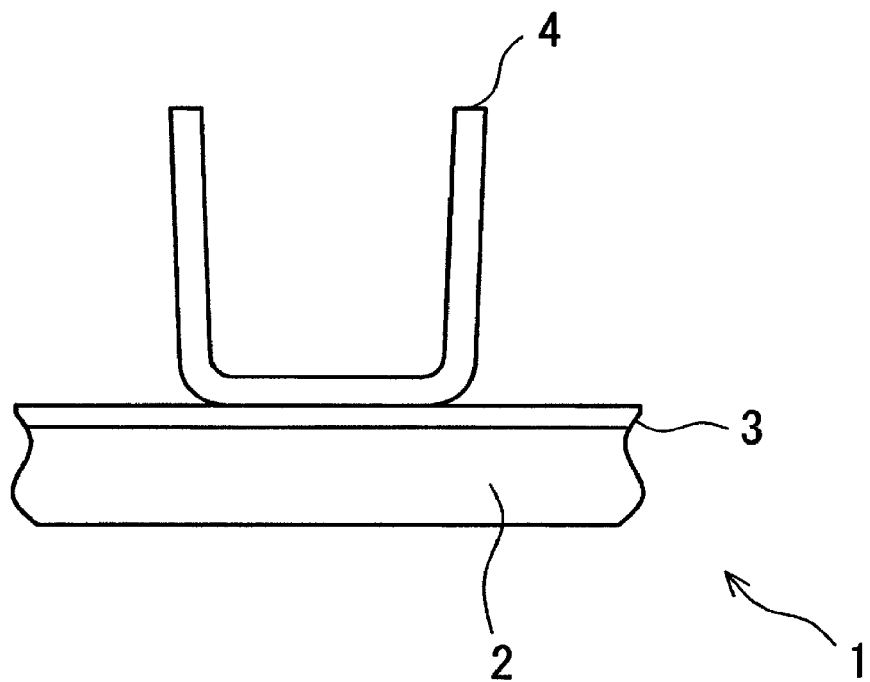
FIG. 1 is a view illustrating a brazing sheet for flux-free brazing according to an embodiment of the present invention.

Hereinafter, an embodiment of the present invention will be described. An aluminum alloy used for a bare material or a brazing sheet of the present invention can be manufactured, for example, by the following method. As the aluminum alloy for the bare material or a core material, an aluminum alloy is adjusted to have a composition including, by mass %, Mg: 0.01% to 2.0% and Bi: 0.005% to 1.5%, further including one or two or more of Si: 0.05% to 1.2%, Mn: 0.1% to 2.5%, Cu: 0.01% to 2.5%, Fe: 0.05% to 1.5%, Zr: 0.01% to 0.3%, Ti: 0.01% to 0.3%, Cr: 0.01% to 0.5%, and Zn: 0.1% to 9.0%, and including a remainder consisting of Al and unavoidable impurities. In the tables, all are shown as the core material. At this time, it is desirable to set the Ca content to 100 ppm or less by mass %. Moreover, the aluminum alloy can also be used as a sacrificial material laminated on the core material.

As an aluminum alloy for a brazing material, an Al—Si-based alloy is used. For example, an Al—Si-based brazing material having a composition including, by mass %, 1.5% to 14% of Si, containing one or more of 0.01% to 2.0% of Mg, 0.005% to 1.5% of Bi, and 0.1% to 9.0% of Zn as desired, and containing a remainder consisting of Al and unavoidable impurities can be used. In addition, the brazing material may contain, as other elements, one or more of 2.0% or less of each of In, Sn, and Mn, 1.0% or less of each of Fe, Ni, Ce, and Se, 0.3% or less of each of Be, Na, Sb, Ti, Zr, P, S. K, and Rb, and the like. At this time, it is desirable to set the Ca content to 100 ppm or less by mass %. Moreover, the brazing material is located at the outermost surface layer, and may have a brazing material with a different composition at the inner layer thereof. That is, the brazing material layer may have a plurality of layers. In a case of having the brazing material of the inner layer, the composition of the brazing material of the inner layer is not particularly limited, and examples thereof include an Al—Si-based brazing material and an Al—Si—Zn-based brazing material. In the bare material, all the brazing materials are indicated by "–".

In the present invention, in order to disperse a fine Mg—Bi compound at the time before brazing, Mg and Bi are dissolved in an ingot as a solid solution to be supersaturated by performing rapid cooling from a high molten metal temperature during the casting of the aluminum alloy used for the bare material and the core material and the brazing material. Specifically, the solid solubility of Mg and Bi can be increased by setting the molten metal temperature to 700° C. or higher. The obtained aluminum alloy ingot is subjected to a homogenization treatment under predetermined conditions. When the homogenization treatment temperature is low, a coarse Mg—Bi compound is precipitated and it is difficult to obtain the distributed state of the Mg—Bi compound of the present invention at the time before the brazing. Therefore, it is desirable to perform the treatment at a treatment temperature of 400° C. or higher for 1 to 10 hours.

Furthermore, in the present invention, in the number of Si particles contained in the brazing material and having a diameter of 0.8 μm or more in terms of equivalent circle diameter, the number of Si particles having a diameter of 1.75 μm or more is desirably 25% or more. In order to obtain this material, the size and area ratio of the Si particles can be controlled by a solidification rate during the casting, the temperature and time of the homogenization treatment, a maximum reduction rate during hot rolling, and the like. For example, when the brazing material is cast, if the cooling rate is lower than 10° C./sec, the size of Si particles generated by solidification cooling becomes coarse. However, the Si particles are crushed in the subsequent rolling step, so that the above conditions can be satisfied. However, even in a case where this cooling rate becomes higher than 10° C./sec, when a heat treatment is performed, for example, under the condition of 500° C. or higher for several hours as the homogenization treatment after the casting, coarsening of the Si particles is achieved, and it is possible to obtain the Si particle size of the conditions of the present invention after the rolling as described above. Moreover, as for the reduction rate during the hot rolling, the larger the reduction rate of one rolling is, the finer the Si particles are crushed. By controlling these conditions in combination, the distribution of the Si particles (size, ratio of coarse particles, and area ratio) can be changed.

Next, only the aluminum alloy, or an assembly of the brazing material and the core material or the like is subjected to hot rolling. At this time, in the present invention, the Mg—Bi compound is adjusted to a predetermined size and number density by controlling a rolling time at a predetermined temperature during the hot rolling, an equivalent strain from the start to the end of the hot rolling, a hot rolling finish temperature, and a cooling rate after the hot rolling.

First, by satisfying the rolling time in a predetermined temperature range during the hot rolling, precipitation of the Mg—Bi compound having a predetermined size defined in the present invention is promoted in an environment where dynamic strain is applied. Specifically, the precipitation of the fine Mg—Bi compound is promoted by setting the rolling time during which the material temperature during the hot rolling is between 400° C. and 500° C. to 10 minutes or more.

Furthermore, by controlling the equivalent strain from the start to the end of the hot rolling, a coarse Mg—Bi crystallized product generated during the casting can be crushed and refined. Specifically, the Mg—Bi crystallized product is sufficiently refined by adjusting a slab thickness and a finish thickness so that the equivalent strain s represented by Formula (1) satisfies ε>5.0.

$$\varepsilon = (2/\sqrt{3})\ln(t_0/t) \quad \text{Formula (1)}$$

$t_0$: Hot rolling start thickness (slab thickness)
$t$: Hot rolling finish thickness Furthermore, when the hot rolling finish temperature is high and a state without dynamic strain is maintained, or when the cooling rate after the hot rolling is slow, a coarser Mg—Bi compound than desired by the present invention is precipitated at grain boundaries and the like. Therefore, by securing a cooling rate of a certain level or more by reducing the hot rolling finish temperature to a predetermined temperature, the precipitation of a coarse Mg—Bi compound is suppressed. Specifically, the precipitation of a coarse Mg—Bi compound is suppressed by setting the hot rolling finish temperature to 250° C. to 350° C. and controlling the cooling rate from the finish temperature to 200° C. to be faster than −20° C./hr. Thereafter, the aluminum alloy or the brazing sheet of the present invention is obtained through cold rolling or the like. In the cold rolling, for example, cold rolling can be performed with a total reduction rate of 75% or more, process annealing can be performed at a temperature of 300° C. to 400° C., and then final rolling with a reduction rate of 40% can be performed. In cold rolling, the Mg—Bi compound is crushed and refined to some extent. However, since the size and number density thereof do not deviate from those targeted by the present invention, the conditions are not particularly limited. The process annealing may not be performed.

Furthermore, in the present invention, Bi particles having a diameter of 5.0 μm or more in terms of equivalent circle diameter are desirably less than 5 in number per 10,000-μm² visual field when observed in a cross section parallel to the rolling direction before brazing. In order to obtain this material, adjustment can be achieved by appropriately combining the mixing ratio of Mg and Bi of the alloy, the molten metal temperature and the cooling rate during the casting, and the homogenization treatment conditions. For example, the generation of the Mg—Bi compound can be promoted by setting the mixing ratio of Mg and Bi blended in the brazing material to 1.5 or more in terms of atomic composition ratio. In the casting, the generation of the Mg—Bi compound can be promoted by reducing the cooling rate to less than 10° C./sec during the casting. Furthermore, in the homogenization treatment, the generation of the Mg—Bi compound in the ingot can be promoted by performing the homogenization treatment at a temperature as high 400° C. or higher.

Hot rolling and cold rolling are performed to obtain a clad material in which the brazing material is superimposed on and joined to one or both surfaces of the bare material or the core material. Through the above process, an aluminum brazing sheet 1 for a heat exchanger in which an aluminum alloy brazing material 3 is clad on a bare material indicated by 4 in FIG. 1 or on one surface of an aluminum alloy core material 2 indicated by 1 in FIG. 1 is obtained. In the figure, the brazing material is clad on one surface of the core material. However, the brazing material may be clad on both surfaces of the core material. Furthermore, a sacrificial material or the like may be clad on the other surface of the core material. The aluminum alloy can be used as the sacrificial material.

In a case where a fin material for a heat exchanger is obtained by the cold rolling or the like, thereafter, corrugating or the like is performed as necessary. The corrugating process can be performed by passing between two rotating molds, enables satisfactory processing, and exhibits excellent formability.

The fin material obtained in the above process is subjected to brazing as an assembly combined with other constituent members (tube, header, and the like) as the constituent members of the heat exchanger. The assembly is disposed in a heating furnace having a non-oxidizing atmosphere under a normal pressure. A non-oxidizing gas can be constituted using an inert gas such as nitrogen gas, argon, a reducing gas such as hydrogen or ammonia, or a mixed gas thereof. Although the pressure of the atmosphere in a brazing furnace is basically the normal pressure, for example, in order to improve a gas replacement efficiency inside a product, a medium to low vacuum of about 100 kPa to 0.1 Pa in a temperature range before melting the brazing material may be employed, or a positive pressure of 5 to 100 Pa from the atmospheric pressure may be employed in order to suppress the infiltration of outside air (atmosphere) into the furnace. These pressure ranges are included in a range of "without depressurization" in the present invention.

The heating furnace does not need to have a sealed space, and may be a tunnel type having a carry-in port and a carry-out port for the brazing material. Even in such a heating furnace, non-oxidizing properties are maintained by continuously blowing the inert gas into the furnace. The non-oxidizing atmosphere desirably has an oxygen concentration of 100 ppm or less by volume ratio.

In the above atmosphere, for example, heating is performed at a temperature rising rate of 10 to 200° C./min, and braze joining is performed under heat treatment conditions in which an attainment temperature of the assembly is 559° C. to 630° C. Under the brazing conditions, the brazing time is shortened as the temperature rising rate is increased, so that the growth of an oxide film on a material surface is suppressed and the brazability is improved. Brazing is possible when the attainment temperature is equal to or higher than at least the solidus temperature of the brazing material. However, the brazing material which flows increases in amount as the temperature approaches the liquidus temperature, and a good joined state is easily obtained at a joint having an open portion. However, when the temperature is too high, brazing erosion tends to proceed, and the structural dimensional accuracy of the assembly after brazing decreases, which is not preferable.

Figure 2:
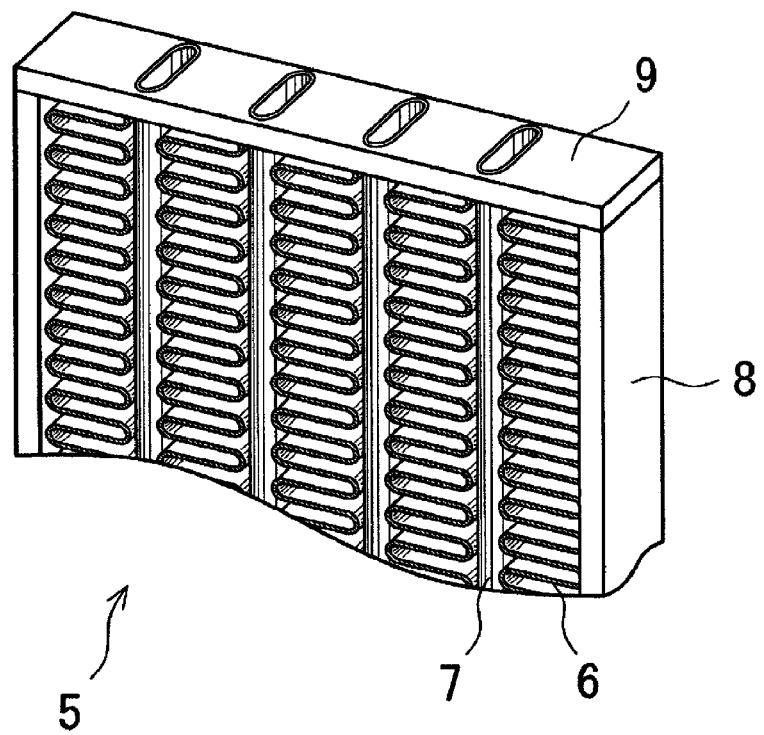
FIG. 2 is a perspective view illustrating an aluminum heat exchanger for a vehicle according to the embodiment of the present invention.

FIG. 2 illustrates an aluminum heat exchanger 5 in which fins 6 are formed using the aluminum brazing sheet 1 and a tube 7 made of an aluminum alloy is used as a brazing target material. The fin 6 and the tube 7 are assembled with a reinforcing member 8 and a header plate 9 to obtain the aluminum heat exchanger 5 for a vehicle or the like by flux-free brazing.

In brazing, the aluminum alloy may not be used as a brazing sheet but may be provided for brazing as a bare material.

EXAMPLES

Example 1

Various bare materials having the compositions shown in Nos. 1 to 30, 80, 82, and 83 of Table 1 and Nos. 62 to 71 of Table 2 (remainder consisting of Al and unavoidable impurities) were produced into hot rolled sheets under the casting conditions and hot rolling conditions shown in Table 5. As shown in Tables 3 and 4, Nos. 1 to 30, 80, 82, and 83, and Nos. 62 to 71, cladding of a brazing material was not provided. Thereafter, cold rolled sheets having a thickness of 0.10 mm and having an H14 equivalent grade were produced by cold rolling including process annealing and formed into a corrugated fin shape. In addition, as a brazing target member, a brazing sheet having a sheet thickness of 0.3 mm was produced by combining a brazing material containing, by mass %, 10% of Si and 0.5% of Mg with a core material of A3003 alloy at a clad ratio of 10%, and was formed into a tube having a width of 25 mm with the brazed surface facing outward.

Corrugated fins made of various bare materials and tubes made of the brazing sheets were combined to form cores having a 15-stage tube and a length of 300 mm as brazing evaluation models. The core was heated to 600° C. in a brazing furnace in a nitrogen atmosphere (oxygen content 20 ppm), and the brazed state was evaluated.

Example 2

Various brazing sheets having the compositions (remainder consisting of Al and unavoidable impurities) shown in Nos. 31 to 61, 81, and 84 to 86 of Tables 1 and 3 (Table 1; core materials, Table 3; brazing materials) and Nos. 72 to 79 of Tables 2 and 4 (Table 2; core materials, Table 4; brazing materials) were produced into hot rolled sheets under the casting conditions and hot rolling conditions shown in Table 5. Thereafter, cold rolled sheets having a thickness of 0.30 mm and having an H14 equivalent grade were produced by cold rolling including process annealing. In the brazing sheet, the clad ratio of the brazing material was set to 10%. Moreover, as the brazing target member, a corrugated fin of an aluminum bare material (0.1 mm thickness) of A3003 alloy and H14 was prepared.

A tube having a width of 25 mm was produced using the brazing sheet, and the tube and the corrugated fin were combined so that the tube brazing material and the corrugated fin are in contact with each other, thereby forming a core having a 15-stage tube and a length of 300 mm as a brazing evaluation model. The core was heated to 600° C. and held for 5 minutes in a brazing furnace in a nitrogen atmosphere (oxygen content 20 ppm), and the brazed state was evaluated.

For each specimen in Examples 1 and 2, the following evaluation was performed, and the evaluation results are shown in Tables 7 and 8.

Brazability

A joint ratio was obtained by the following formula, and superiority and inferiority between the samples were evaluated. Fin joint ratio=(total brazing length of fin and tube/total contact length of fin and tube)×100. The determination was made according to the following criteria, and the results are shown in Tables 6 and 7.

| | |
|---|---|
| Fin joint ratio after brazing | A: 98% or more<br>B: 90% or more and less than 98%<br>C: 80% or more and less than 90%<br>D: less than 80% |

Joint Fillet Length

Figure 3:
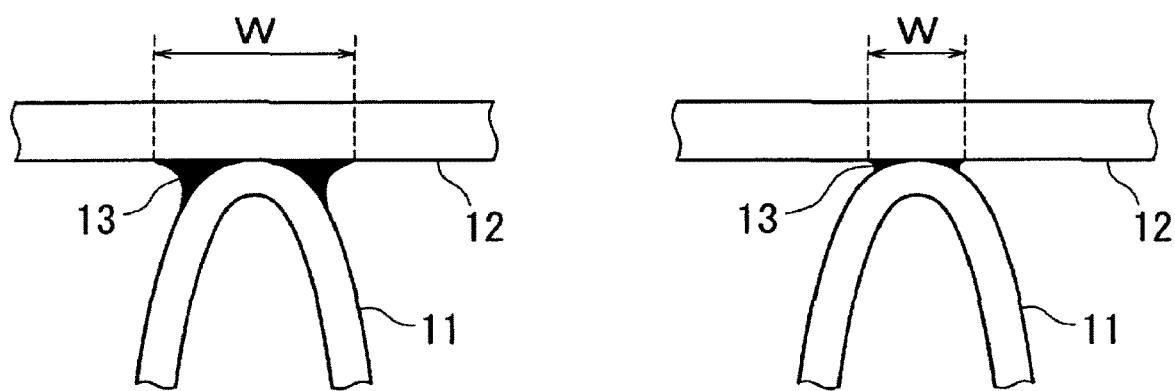
FIG. 3 is a view illustrating a brazing evaluation model in an example of the present invention.

A portion of the brazed core was cut out, embedded in a resin, and mirror-polished, and the fillet length at a joint was measured using an optical microscope. As a measurement method, the width W of a joint 13 illustrated in FIG. 3 was measured at 20 points for each sample, and superiority or inferiority was evaluated by the average value thereof. The determination was based on the following criteria and shown in Tables 6 and 7.

A: 1.0 mm or more
B: 0.8 mm or more and less than 1.0 mm
C: 0.6 mm or more and less than 0.8 mm
D: less than 0.6 mm Strength after Brazing The brazing target member and the brazing sheet were placed in a furnace in a drop form, and a brazing equivalent heat treatment was performed under the brazing conditions. Thereafter, the sample was cut out, a tensile test was conducted at room temperature by a normal method based on JIS, and a tensile strength was evaluated. The results are shown in Tables 6 and 7. While all of the examples showed good brazability, the comparative examples did not obtain sufficient joining.

Ratio and Area Ratio of Si Particles having Diameter of 1.75 μm or More on Surface of Brazing Material Layer Regarding the produced aluminum clad material, the outermost surface of the brazing material was polished with 0.1-μm abrasive grains, and fully automatic particle analysis using an electron beam microanalyzer (EPMA) was performed on an observation visual field of 10,000 μm$^2$ (corresponding to 100-μm square) for each sample from the surface direction. In the measurement, the ratio (%) of the number of Si particles having an equivalent circle diameter of 1.75 μm or more to the number of Si particles having an equivalent circle diameter of 0.8 μm or more was calculated, and furthermore, the area ratio (to the surface area) of the particles having an equivalent circle diameter of 1.75 μm or more was calculated. The measurement results are shown in Tables 3 and 4.

TABLE 1

| | Specimen No. | Elements added to bare material or core material [wt %] | | | | | | | | | | Manu-facturing method | Mg—Bi compound of less than 5 μm [/10000 μm$^2$] | Mg—Bi compound of 5 μm or more [/10000 μm$^2$] | Bi particles [/10000 μm$^2$] | Atomic composition ratio Mg/Bi of Core material |
|---|---|---|---|---|---|---|---|---|---|---|---|---|---|---|---|---|
| | | Mg | Bi | Si | Mn | Cu | Fe | Zr | Ti | Cr | Zn | Ca (ppm) | | | | | |
| Example | 1 | 0.01 | 0.3 | 0.6 | — | — | — | — | — | — | — | 8 | E | 14 | 1 | 4 | 0.3 |
| | 2 | 0.1 | 0.3 | — | — | — | — | — | — | — | — | 8 | D | 26 | 0 | 3 | 2.9 |
| | 3 | 1.5 | 0.3 | 0.6 | 1.0 | — | 0.3 | — | — | — | — | 8 | B | 46 | 0 | 2 | 43.0 |
| | 4 | 2.0 | 0.3 | 0.6 | 1.0 | — | 0.3 | — | — | 0.2 | — | 8 | H | 47 | 0 | 2 | 57.3 |
| | 5 | 0.5 | 0.01 | 0.6 | 1.0 | 0.5 | — | 0.1 | — | 0.2 | — | 8 | J | 18 | 0 | 1 | 859.8 |
| | 6 | 0.5 | 0.05 | 0.6 | 1.0 | 0.5 | — | 0.1 | — | — | — | 8 | I | 28 | 0 | 2 | 86.0 |
| | 7 | 0.5 | 0.5 | 0.6 | 0.5 | 0.5 | — | 0.1 | — | — | — | 8 | C | 62 | 0 | 3 | 8.6 |
| | 8 | 0.5 | 1.5 | 0.6 | 0.5 | 0.5 | — | 0.1 | — | — | — | 8 | B | 67 | 0 | 4 | 2.9 |
| | 9 | 0.5 | 0.3 | 0.1 | 1.0 | — | 0.3 | — | — | — | — | 50 | C | 38 | 0 | 3 | 14.3 |
| | 10 | 0.5 | 0.3 | 1.0 | 1.0 | — | 0.3 | — | — | — | — | 8 | J | 58 | 0 | 2 | 14.3 |
| | 11 | 0.05 | 0.5 | 0.6 | 0.3 | 0.2 | 0.5 | — | — | — | 0.5 | 8 | E | 31 | 0 | 3 | 0.9 |
| | 12 | 0.3 | 0.7 | 0.6 | 1.8 | 0.2 | 0.5 | — | — | — | 0.3 | 8 | R | 54 | 0 | 3 | 3.7 |
| | 13 | 0.3 | 0.7 | 0.6 | 0.5 | 0.02 | — | — | — | — | 0.2 | 8 | C | 57 | 0 | 3 | 3.7 |
| | 14 | 0.7 | 0.2 | 0.6 | 0.5 | 1.2 | — | — | 0.1 | — | — | 8 | H | 43 | 0 | 3 | 30.1 |
| | 15 | 0.7 | 0.2 | 0.6 | 0.5 | 0.3 | 0.1 | — | 0.1 | — | — | 120 | D | 45 | 0 | 2 | 30.1 |
| | 16 | 0.2 | 0.2 | 0.6 | 0.5 | 0.3 | 0.6 | — | 0.1 | — | — | 8 | A | 25 | 0 | 3 | 8.6 |
| | 17 | 0.7 | 0.2 | 0.6 | — | 0.3 | 0.2 | 1.05 | 0.1 | — | — | 8 | B | 34 | 0 | 2 | 30.1 |
| | 18 | 0.7 | 0.2 | 0.6 | — | 0.3 | 0.2 | 0.2 | — | — | — | 8 | D | 44 | 0 | 3 | 30.1 |
| | 19 | 0.2 | 0.2 | 0.6 | — | — | 0.2 | — | 0.05 | — | — | 8 | A | 26 | 0 | 3 | 8.6 |
| | 20 | 0.2 | 0.2 | 0.6 | 0.5 | — | — | — | 0.2 | — | — | 8 | B | 18 | 0 | 3 | 8.6 |
| | 21 | 0.3 | 0.2 | 0.6 | 0.5 | — | — | — | 0.1 | 0.05 | — | 8 | B | 31 | 0 | 3 | 12.9 |
| | 22 | 0.3 | 0.2 | 0.6 | 0.5 | — | 0.3 | — | — | 0.3 | — | 8 | D | 40 | 0 | 3 | 12.9 |
| | 23 | 0.3 | 0.2 | — | 0.5 | — | 0.3 | — | — | — | 0.5 | 8 | A | 23 | 0 | 3 | 12.9 |
| | 24 | 0.1 | 0.3 | — | 0.5 | — | 0.3 | — | — | — | 7.0 | 8 | D | 26 | 0 | 3 | 2.9 |
| | 25 | 0.5 | 0.3 | — | 0.5 | — | 0.3 | — | — | — | — | 50 | C | 38 | 0 | 3 | 14.3 |
| | 26 | 0.2 | 0.3 | 0.6 | 0.5 | — | 0.3 | — | — | — | — | 8 | J | 58 | 0 | 2 | 5.7 |
| | 27 | 0.2 | 0.2 | 0.6 | 0.5 | 0.2 | 0.5 | — | — | — | — | 8 | A | 26 | 0 | 3 | 8.6 |
| | 28 | 0.2 | 0.2 | 0.5 | 0.5 | 0.2 | 0.5 | — | — | 0.2 | — | 8 | B | 17 | 0 | 3 | 8.6 |
| | 29 | 0.3 | 0.2 | 0.5 | 0.5 | 0.8 | — | — | — | 0.2 | — | 8 | B | 31 | 0 | 3 | 12.9 |
| | 30 | 0.3 | 0.2 | 0.5 | 0.5 | 0.8 | — | — | 0.1 | — | — | 8 | D | 41 | 0 | 3 | 12.9 |
| | 31 | 0.01 | 0.3 | 0.6 | — | — | — | — | — | — | — | 8 | E | 14 | 1 | 4 | 0.3 |
| | 32 | 0.1 | 0.3 | — | — | — | — | — | — | — | — | 8 | D | 26 | 0 | 3 | 2.0 |
| | 33 | 1.5 | 0.3 | 0.6 | 1.0 | — | 0.3 | — | — | — | — | 8 | B | 46 | 0 | 2 | 43.9 |
| | 34 | 2.0 | 0.3 | 0.6 | 1.0 | — | 0.3 | — | — | 0.2 | — | 8 | H | 47 | 0 | 2 | 57.3 |
| | 35 | 0.5 | 0.01 | 0.6 | 1.0 | 0.5 | — | 0.1 | — | 0.2 | — | 8 | J | 18 | 0 | 1 | 859.8 |
| | 36 | 0.5 | 0.05 | 0.6 | 1.0 | 0.5 | — | 0.1 | — | — | — | 8 | I | 28 | 0 | 2 | 86.0 |
| | 37 | 0.5 | 0.5 | 0.6 | 0.5 | 0.5 | — | 0.1 | — | — | — | 8 | C | 62 | 0 | 3 | 8.6 |
| | 38 | 0.5 | 1.5 | 0.6 | 0.5 | 0.5 | — | 0.1 | — | — | — | 8 | B | 67 | 0 | 4 | 2.9 |
| | 39 | 0.5 | 0.3 | 0.1 | 1.0 | — | 0.3 | — | — | — | — | 50 | C | 38 | 0 | 3 | 14.3 |
| | 40 | 0.5 | 0.3 | 1.0 | 1.0 | — | 0.3 | — | — | — | — | 8 | J | 58 | 0 | 2 | 14.3 |
| | 41 | 0.05 | 0.5 | 0.6 | 0.3 | 0.2 | 0.5 | — | — | — | 0.5 | 8 | E | 31 | 0 | 3 | 0.0 |
| | 42 | 0.3 | 0.7 | 0.6 | 1.8 | 0.2 | 0.5 | — | — | — | 0.3 | 8 | B | 54 | 0 | 3 | 3.7 |
| | 43 | 0.3 | 0.7 | 0.6 | 0.5 | 0.02 | — | — | — | — | 0.2 | 8 | C | 57 | 0 | 3 | 3.7 |
| | 44 | 0.7 | 0.2 | 0.6 | 0.5 | 1.2 | — | — | 0.1 | — | — | 8 | H | 43 | 0 | 3 | 30.1 |
| | 45 | 0.7 | 0.2 | 0.6 | 0.5 | 0.3 | 0.1 | — | 0.1 | — | — | 120 | D | 45 | 0 | 2 | 30.1 |
| | 46 | 0.2 | 0.2 | 0.6 | 0.5 | 0.3 | 0.6 | — | 0.1 | — | — | 8 | A | 25 | 0 | 3 | 8.6 |
| | 47 | 0.7 | 0.2 | 0.6 | — | 0.3 | 0.2 | 0.05 | 0.1 | — | — | 8 | B | 34 | 0 | 2 | 30.1 |
| | 48 | 0.7 | 0.2 | 0.6 | — | 0.3 | 0.2 | 0.2 | — | — | — | 8 | D | 44 | 0 | 3 | 30.1 |
| | 49 | 0.2 | 0.2 | 0.6 | — | — | 0.2 | — | 0.05 | — | — | 8 | A | 26 | 0 | 3 | 8.6 |
| | 50 | 0.2 | 0.2 | 0.6 | 0.5 | — | — | — | 0.2 | — | — | 8 | B | 18 | 0 | 3 | 8.6 |
| | 51 | 0.3 | 0.2 | 0.6 | 0.5 | — | — | — | 0.1 | 0.05 | — | 8 | B | 31 | 0 | 3 | 12.9 |
| | 52 | 0.3 | 0.2 | 0.6 | 0.5 | — | 0.3 | — | — | 0.3 | — | 8 | D | 40 | 0 | 3 | 12.9 |
| | 53 | 0.3 | 0.2 | — | 0.5 | — | 0.3 | — | — | — | 0.5 | 8 | A | 23 | 0 | 3 | 12.9 |
| | 54 | 0.1 | 0.3 | — | 0.5 | — | 0.3 | — | — | — | 1.0 | 8 | D | 26 | 0 | 3 | 2.9 |

TABLE 1-continued

| Specimen No. | Elements added to bare material or core material [wt %] | | | | | | | | | | | Manu-facturing method | Mg—Bi compound of less than 5 μm [/10000 μm²] | Mg—Bi compound of 5 μm or more [/10000 μm²] | Bi particles [/10000 μm²] | Atomic composition ratio Mg/Bi of Core material |
|---|---|---|---|---|---|---|---|---|---|---|---|---|---|---|---|---|
| | Mg | Bi | Si | Mn | Cu | Fe | Zr | Ti | Cr | Zn | Ca (ppm) | | | | | |
| 55 | 0.5 | 0.3 | — | 0.5 | — | 0.3 | — | — | — | — | 50 | C | 38 | 0 | 3 | 14.3 |
| 56 | 0.2 | 0.3 | 0.6 | 0.5 | — | 0.3 | — | — | — | — | 8 | J | 58 | 0 | 2 | 5.7 |
| 57 | 0.2 | 0.2 | 0.6 | 0.5 | 0.2 | 0.5 | — | — | — | — | 8 | A | 26 | 0 | 3 | 8.6 |
| 58 | 0.2 | 0.2 | 0.5 | 0.5 | 0.2 | 0.5 | — | — | — | 0.2 | 8 | B | 17 | 0 | 3 | 8.6 |
| 59 | 0.3 | 0.2 | 0.5 | 0.5 | 0.8 | — | — | — | — | 0.2 | 8 | B | 31 | 0 | 3 | 12.9 |
| 60 | 0.3 | 0.2 | 0.5 | 0.5 | 0.8 | — | — | 0.1 | — | — | 8 | D | 41 | 0 | 3 | 12.9 |
| 61 | 0.3 | 0.2 | 0.5 | 0.5 | 0.8 | — | — | 0.1 | — | — | 8 | D | 41 | 0 | 3 | 12.9 |
| 80 | 0.05 | 0.5 | 0.6 | 0.3 | 0.2 | 0.5 | — | — | — | 0.5 | 120 | E | 31 | 0 | 3 | 0.9 |
| 81 | 0.01 | 0.3 | 0.6 | — | — | — | — | — | — | — | 120 | P | 14 | 1 | 4 | 0.3 |
| 82 | 0.09 | 0.5 | 0.6 | 0.3 | 0.2 | 0.5 | — | — | — | 0.5 | 8 | E | 34 | 0 | 2 | 1.5 |
| 83 | 0.7 | 0.2 | 0.6 | 0.5 | 0.3 | 0.1 | — | 0.1 | — | — | 100 | D | 45 | 0 | 2 | 30.1 |
| 84 | 0.2 | 0.2 | 0.6 | 0.5 | — | — | — | 0.2 | — | — | 8 | B | 18 | 0 | 3 | 8.6 |
| 85 | 0.3 | 0.2 | 0.5 | 0.5 | 0.8 | — | — | 0.1 | — | — | 8 | R | 41 | 0 | 3 | 12.9 |
| 86 | 0.5 | 0.3 | — | 0.5 | — | 0.3 | — | — | — | — | 50 | Q | 38 | 0 | 3 | 14.3 |

TABLE 2

| | Specimen No. | Elements added to bare material or core material [wt %] | | | | | | | | | | | Manu-facturing method | Mg—Bi compound of less than 5 μm [/10000 μm²] | Mg—Bi compound of 5 μm or more [/10000 μm²] | Bi particles [/10000 μm²] | Atomic composition ratio Mg/Bi of Core material |
|---|---|---|---|---|---|---|---|---|---|---|---|---|---|---|---|---|---|
| | | Mg | Bi | Si | Mn | Cu | Fe | Zr | Ti | Cr | Zn | Ca (ppm) | | | | | |
| Comparative Example | 62 | 0.01 | 0.3 | — | — | — | — | — | — | — | — | 8 | B | 9 | 3 | 3 | 0.1 |
| | 63 | 2.2 | 0.3 | — | — | — | — | — | — | — | — | 8 | Cannot be evaluated due to improper production | | | | 63.1 |
| | 64 | 0.2 | 0 | — | 1.5 | — | — | 0.1 | — | 0.2 | — | 8 | C | 7 | 6 | 2 | 573.2 |
| | 65 | 0.5 | 1.6 | — | 1.0 | — | — | 0.1 | — | — | — | 8 | Cannot be evaluated due to improper production | | | | 2.7 |
| | 66 | 0.3 | 0.1 | 0.05 | 0.5 | 0.3 | — | — | — | — | — | 8 | M | 8 | 5 | 2 | 25.8 |
| | 67 | 0.5 | 0.1 | 0.3 | 0.5 | 0.3 | 0.3 | — | — | — | — | 8 | L | 7 | 6 | 5 | 43.0 |
| | 68 | 0.2 | 0.1 | 0.3 | 0.5 | 1.0 | 0.05 | — | — | — | — | 8 | K | 9 | 3 | 2 | 17.2 |
| | 69 | 0.5 | 0.3 | 0.5 | 0.5 | 1.0 | 0.3 | — | — | — | — | 8 | O | 8 | 5 | 3 | 14.3 |
| | 70 | 0.2 | 0.01 | 0.5 | 0.5 | — | 0.3 | — | — | — | — | 50 | N | 9 | 3 | 4 | 343.9 |
| | 71 | 0.5 | 0.3 | — | 0.5 | — | 0.3 | — | — | — | — | 8 | L | 9 | 3 | 6 | 14.3 |
| Reference Example | 72 | 0.5 | 0.5 | — | 0.2 | 1.5 | 0.2 | — | — | — | — | 8 | C | 36 | 0 | 3 | 8.6 |
| | 73 | 0.5 | 0.2 | — | 0.5 | 0.5 | 0.2 | — | — | — | — | 8 | Cannot be evaluated due to improper production | | | | 21.5 |
| | 74 | 0.7 | 0.2 | — | 2.6 | 0.5 | 0.2 | — | — | — | — | 8 | Cannot be evaluated due to improper production | | | | 30.1 |
| | 75 | 0.7 | 0.2 | — | 0.1 | 2.6 | 0.2 | — | — | — | — | 8 | Cannot be evaluated due to improper production | | | | 30.1 |
| | 76 | 0.7 | 0.3 | — | 1.5 | 0.5 | 1.6 | — | — | — | — | 8 | Cannot be evaluated due to improper production | | | | 20.1 |
| | 77 | 0.7 | 0.3 | — | — | 0.5 | 0.2 | 0.3 | 0.32 | — | — | 8 | Cannot be evaluated due to improper production | | | | 20.1 |
| | 78 | 0.5 | 0.3 | — | — | 0.5 | 0.2 | — | 0.21 | 0.51 | — | 8 | Cannot be evaluated due to improper production | | | | 14.3 |
| | 79 | 0.5 | 0.1 | — | — | 1.2 | 0.2 | — | — | — | 9.1 | 8 | A | 28 | 0 | 3 | 43.0 |

TABLE 3

| Specimen No. | Brazing material composition [wt %] | | | | Brazing material Ratio of Si particles of 1.75 μm or more [%] | Brazing material Area ratio of Si particles of 1.75 μm or more [%] |
|---|---|---|---|---|---|---|
| | Mg | Si | Bi | Ca (ppm) | | |
| Example 1 | — | — | — | — | — | — |
| 2 | — | — | — | — | — | — |
| 3 | — | — | — | — | — | — |
| 4 | — | — | — | — | — | — |
| 5 | — | — | — | — | — | — |
| 6 | — | — | — | — | — | — |
| 7 | — | — | — | — | — | — |
| 8 | — | — | — | — | — | — |
| 9 | — | — | — | — | — | — |
| 10 | — | — | — | — | — | — |
| 11 | — | — | — | — | — | — |
| 12 | — | — | — | — | — | — |
| 13 | — | — | — | — | — | — |
| 14 | — | — | — | — | — | — |
| 15 | — | — | — | — | — | — |
| 16 | — | — | — | — | — | — |
| 17 | — | — | — | — | — | — |
| 18 | — | — | — | — | — | — |
| 19 | — | — | — | — | — | — |
| 20 | — | — | — | — | — | — |

TABLE 3-continued

| Specimen No. | Brazing material composition [wt %] | | | | Ca (ppm) | Brazing material Ratio of Si particles of 1.75 μm or more [%] | Brazing material Area ratio of Si particles of 1.75 μm or more [%] |
|---|---|---|---|---|---|---|---|
| | Mg | Si | Bi | Zn | | | |
| 21 | — | — | — | — | — | — | — |
| 22 | — | — | — | — | — | — | — |
| 23 | — | — | — | — | — | — | — |
| 24 | — | — | — | — | — | — | — |
| 25 | — | — | — | — | — | — | — |
| 26 | — | — | — | — | — | — | — |
| 27 | — | — | — | — | — | — | — |
| 28 | — | — | — | — | — | — | — |
| 29 | — | — | — | — | — | — | — |
| 30 | — | — | — | — | — | — | — |
| 31 | 0.5 | 7.5 | 0.3 | — | 8 | 34 | 0.4 |
| 32 | 0.5 | 7.5 | 0.3 | — | 8 | 45 | 0.6 |
| 33 | 0.5 | 7.5 | 0.3 | — | 8 | 36 | 0.4 |
| 34 | 0.5 | 7.5 | 0.3 | — | 8 | 44 | 0.5 |
| 35 | 0.5 | 7.5 | 0.3 | — | 8 | 40 | 0.7 |
| 36 | 0.5 | 7.5 | 0.3 | — | 8 | 43 | 0.5 |
| 37 | 0.5 | 7.5 | 0.3 | — | 8 | 35 | 0.4 |
| 38 | 0.5 | 7.5 | 0.3 | 1.0 | 8 | 36 | 0.4 |
| 39 | 0.5 | 7.5 | 0.3 | 1.0 | 8 | 35 | 0.5 |
| 40 | 0.5 | 7.5 | 0.3 | 2.0 | 50 | 34 | 0.6 |
| 41 | 0.05 | 10.5 | 0.3 | 2.0 | 8 | 37 | 0.5 |
| 42 | 0.3 | 10.5 | 0.3 | 3.0 | 8 | 40 | 0.5 |
| 43 | 0.3 | 10.5 | 0.3 | 3.0 | 8 | 38 | 0.5 |
| 44 | 0.7 | 10.5 | 0.2 | 2.0 | 8 | 48 | 0.6 |
| 45 | 0.7 | 10.5 | 0.7 | 2.0 | 8 | 48 | 0.7 |
| 46 | 0.2 | 10.5 | 0.7 | — | 8 | 40 | 0.5 |
| 47 | 0.7 | 10.5 | 0.2 | — | 8 | 41 | 0.5 |
| 48 | 0.7 | 10.5 | 0.2 | — | 8 | 47 | 0.8 |
| 49 | 0.5 | 10.5 | 0.2 | — | 8 | 39 | 0.5 |
| 50 | 0.5 | 10.5 | 0.2 | — | 80 | 40 | 0.5 |
| 51 | 0.3 | 11.5 | 0.2 | — | 8 | 41 | 0.6 |
| 52 | 0.3 | 11.5 | 0.2 | — | 8 | 49 | 0.9 |
| 53 | 0.1 | 10.5 | 0.2 | — | 8 | 40 | 0.5 |
| 54 | 1.5 | 10.5 | 0.2 | — | 80 | 47 | 0.9 |
| 55 | 0.3 | 3.0 | 0.2 | — | 8 | 31 | 0.2 |
| 56 | 0.3 | 12.0 | 0.2 | — | 8 | 37 | 1.1 |
| 57 | 0.3 | 10.5 | 0.05 | — | 8 | 40 | 0.5 |
| 58 | 0.3 | 10.5 | 0.5 | — | 8 | 42 | 0.5 |
| 59 | 0.3 | 7.5 | 0.1 | 0.5 | 8 | 36 | 0.4 |
| 60 | 0.3 | 7.5 | 0 | 0.7 | 8 | 36 | 0.6 |
| 61 | 0 | 7.5 | 0 | — | 8 | 35 | 0.6 |
| 80 | — | — | — | — | — | — | — |
| 81 | 0.5 | 7.5 | 0.3 | — | 105 | 24 | 0.09 |
| 82 | — | — | — | — | — | — | — |
| 83 | — | — | — | — | — | — | — |
| 84 | 0.5 | 10.5 | 0.2 | — | 100 | 40 | 0.5 |
| 85 | 0 | 7.5 | 0 | — | 8 | 25 | 0.4 |
| 86 | 0.3 | 3.0 | 0.2 | — | 8 | 26 | 0.1 |

TABLE 4

| | Specimen No. | Brazing material composition [wt %] | | | | Ca (ppm) | Ratio of Si particles of 1.75 μm or more [%] | Area ratio of Si particles of 1.75 μm or more [%] |
|---|---|---|---|---|---|---|---|---|
| | | Mg | Si | Bi | Zn | | | |
| Comparative Example | 62 | — | — | — | — | — | — | — |
| | 63 | — | — | — | — | — | — | — |
| | 64 | — | — | — | — | — | — | — |
| | 65 | — | — | — | — | — | — | — |
| | 66 | — | — | — | — | — | — | — |
| | 67 | — | — | — | — | — | — | — |
| | 68 | — | — | — | — | — | — | — |
| | 69 | — | — | — | — | — | — | — |
| | 70 | — | — | — | — | — | — | — |
| | 71 | — | — | — | — | — | — | — |
| Reference Example | 72 | 0.5 | 10.5 | — | 1.0 | 8 | 38 | 0.5 |
| | 73 | 2.1 | 10.5 | — | 1.0 | 8 | — | — |
| | 74 | 0.5 | 10.5 | — | — | 8 | — | — |
| | 75 | 0.5 | 10.5 | — | — | 8 | — | — |
| | 76 | 0.5 | 7.5 | — | — | 8 | — | — |
| | 77 | 0.5 | 7.5 | — | — | 8 | — | — |
| | 78 | 0.5 | 7.5 | — | — | 8 | — | — |
| | 79 | 0.5 | 7.5 | — | — | 8 | 33 | 0.3 |

TABLE 5

| | Specimen No. | Core material Casting condition Molten metal temperature (° C.) | Homogenization condition Temperature and time (° C., h) | Hot rolling conditions Rolling time between 400° C. and 500° C. (min) | Equivalent strain ε | Finish temperature (° C.) | Cooling rate (° C./h) |
|---|---|---|---|---|---|---|---|
| Target range | A | 710 | 450° C., 5 h | 15 | 5.7 | 320 | 25 |
| | B | 715 | 450° C., 5 h | 14 | 5.4 | 334 | 21 |
| | C | 715 | 500° C., 2 h | 10 | 5.5 | 355 | 35 |
| | D | 725 | 550° C., 2 h | 14 | 5.5 | 274 | 28 |
| | E | 725 | 400° C., 8 h | 18 | 5.9 | 290 | 38 |
| | F | 735 | 400° C., 8 h | 22 | 5.7 | 252 | 35 |
| | G | 735 | 450° C., 8 h | 15 | 6.1 | 315 | 42 |
| | H | 720 | 450° C., 8 h | 24 | 5 | 340 | 34 |
| | I | 755 | 500° C., 5 h | 14 | 6.4 | 347 | 52 |
| | J | 745 | 500° C., 5 h | 30 | 5 | 290 | 32 |
| | P | 725 | 400° C., 8 h | 17 | 5.9 | 310 | 41 |
| | Q | 705 | 450° C., 2 h | 10 | 5.2 | 355 | 28 |
| | R | 725 | 550° C., 2 h | 14 | 5.2 | 274 | 26 |

TABLE 5-continued

| | | Core material | | | | | |
|---|---|---|---|---|---|---|---|
| | | Casting condition | Homogenization | Hot rolling conditions | | | |
| Specimen No. | | Molten metal temperature (° C.) | condition Temperature and time (° C., h) | Rolling time between 400° C. and 500° C. (min) | Equivalent strain ε | Finish temperature (° C.) | Cooling rate (° C./h) |
| Outside the target | K | 695 | 400° C., 8 h | 15 | 5.3 | 267 | 18 |
| | L | 680 | 380° C., 8 h | 8 | 5.2 | 220 | 12 |
| | M | 715 | 380° C., 8 h | 22 | 4.8 | 337 | 36 |
| | N | 670 | 350° C., 8 h | 15 | 4.6 | 395 | 22 |
| | O | 705 | 350° C. 8 h | 7 | 5.7 | 322 | 35 |

TABLE 6

| Specimen No. | Brazability Joint ratio | Fillet length | Strength after brazing [MPa] |
|---|---|---|---|
| Example 1 | C | C | 108 |
| 2 | A | A | 84 |
| 3 | B | C | 221 |
| 4 | B | C | 251 |
| 5 | A | C | 183 |
| 6 | A | B | 183 |
| 7 | B | A | 173 |
| 8 | B | B | 173 |
| 9 | A | B | 136 |
| 10 | A | A | 181 |
| 11 | A | B | 132 |
| 12 | A | A | 177 |
| 13 | A | A | 137 |
| 14 | A | A | 220 |
| 15 | A | C | 176 |
| 16 | A | A | 151 |
| 17 | A | A | 167 |
| 18 | A | A | 167 |
| 19 | A | A | 122 |
| 20 | A | A | 130 |
| 21 | A | A | 136 |
| 22 | A | A | 139 |
| 23 | A | A | 109 |
| 24 | A | A | 97 |
| 25 | A | B | 121 |
| 26 | A | A | 133 |
| 27 | A | A | 145 |
| 28 | A | A | 140 |
| 29 | A | A | 171 |
| 30 | A | A | 171 |
| 31 | A | B | 116 |
| 32 | A | A | 94 |
| 33 | B | C | 217 |
| 34 | B | C | 244 |
| 35 | A | A | 183 |
| 36 | A | A | 183 |
| 37 | B | B | 174 |
| 33 | B | C | 174 |
| 39 | A | A | 141 |
| 40 | A | A | 181 |
| 41 | C | C | 135 |
| 42 | A | A | 177 |
| 43 | A | A | 141 |
| 44 | A | A | 218 |
| 45 | A | A | 178 |
| 46 | A | A | 153 |
| 47 | A | A | 170 |
| 48 | A | A | 170 |
| 49 | A | A | 128 |
| 50 | A | A | 136 |
| 51 | A | A | 140 |
| 52 | A | A | 143 |
| 53 | A | A | 115 |
| 54 | C | C | 111 |
| 55 | A | B | 126 |
| 56 | A | A | 137 |
| 57 | A | A | 148 |
| 58 | A | A | 144 |
| 59 | A | A | 171 |
| 60 | A | B | 171 |
| 61 | A | A | 111 |
| 80 | A | C | 132 |
| 81 | C | C | 116 |
| 82 | A | A | 133 |
| 83 | A | B | 176 |
| 84 | A | B | 136 |
| 85 | B | A | 111 |
| 86 | B | B | 126 |

TABLE 7

| Specimen No. | | Brazability Joint ratio | Fillet length | Strength after brazing [MPa] |
|---|---|---|---|---|
| Comparative Example | 62 | D | D | 78 |
| | 63 | Cannot be evaluated due to improper production | | |
| | 64 | C | D | 120 |
| | 65 | Cannot be evaluated due to improper production | | |
| | 66 | C | D | 123 |
| | 67 | D | D | 151 |
| | 68 | C | D | 165 |
| | 69 | C | D | 196 |
| | 70 | C | D | 128 |
| | 71 | D | D | 121 |
| Reference Example | 72 | Core material melted during brazing | | |
| | 73 | Cannot be evaluated due to improper production | | |
| | 74 | Cannot be evaluated due to improper production | | |
| | 75 | Cannot be evaluated due to improper production | | |
| | 76 | Cannot be evaluated due to improper production | | |
| | 77 | Cannot be evaluated due to improper production | | |
| | 78 | Cannot be evaluated due to improper production | | |
| | 79 | Core material melted during brazing | | |

While the present invention has been described based on the embodiments, the scope of the present invention is not limited to the content of the description, and various modifications of the embodiment can be made without departing from the scope of the present invention.

REFERENCE SIGNS LIST

1 aluminum brazing sheet
2 aluminum alloy core material
3 aluminum alloy brazing material
4 target member 5 aluminum heat exchanger
6 fin
7 tube
13 joint
15 tube

The invention claimed is:

1. An aluminum alloy for brazing provided for brazing via an Al—Si-based brazing material, comprising: by mass %, 0.01% to 2.0% of Mg; and 0,005% to 1.5% of Bi, wherein
in the aluminum alloy, there are more than 10 Mg—Bi-based compounds having a diameter of 0.01 µm or more and less than 5.0 µm in ns of equivalent circle diameter per 10,000-µm² visual field and there are less than 2 Mg—Bi-based compounds having a diameter of 5.0 µm or more per 10,000-µm² visual field in a cross section parallel to a rolling direction, and
in the aluminum alloy, there are less than 5 Bi particles consisting of Bi having a diameter of 5.0 µm or more in terms of equivalent circle diameter per 10,000-µm² visual field in the cross section parallel to the rolling direction.

2. The aluminum alloy for brazing according to claim 1, wherein
in the aluminum alloy, an atomic composition ratio between Mg and Bi is Mg/Bi=1.5 or more.

3. The aluminum alloy for brazing according to claim 1, wherein
Ca content in the aluminum alloy is 100 ppm or less in terms of mass ppm.

4. The aluminum alloy for brazing according to claim 1, further comprising, by mass %:
one or more of Si: 0.05% to 1.2%, Mn: 0.1% to 7.5%, Cu: 0.01% to 2.5%, Fe: 0.05% to 1.5%, Zr: 0.01% to 0.3%, Ti: 0.011% to 0.3%, Cr: 0.01% to 0.5%, and Zn: 0.1% to 9.0%.

5. The aluminum alloy for brazing according to claim 2, further comprising, by mass %:
one or more of Si: 0.05% to 1.2%, Mn: 0.1% to 2.5%, Cu: 0.01% to 2.5%, Fe: 0.05% to 1.5%, Zr: 0.01% to 0.3%, Ti: 0.01% to 0.3%, Cr: 0.01% to 0.5%, and Zn: 0.1% to 9.0%.

6. A brazing sheet, having
a multilayer structure wherein at least one layer of the aluminum alloy according to claim 2 is laminated,
wherein at least one of the at least one layer is an outermost layer of the multilayer structure, and
the outermost layer has an Al—Si-based brazing material laminated on at least one surface thereof.

7. The brazing sheet for brazing according to claim 6, wherein
the Al—Si-based brazing material further comprises 0.1% to 9.0% of Zn by mass %.

8. A brazing sheet having
a multilayer structure wherein at least one layer of the aluminum alloy according to claim 4 is laminated,
wherein at least one of the at least one layer is an outermost layer of the multilayer structure, and
the outermost laver has an Al—Si-based brazing material laminated on at least one surface thereof.

9. The aluminum brazing sheet according to claim 8, wherein
in the Al—Si-based brazing material, a number of Si particles having a diameter of 1.75 µm or more in terms of equivalent circle diameter is 25% or more with respect to a number of Si particles having a diameter of 0.8 µm or more in terms of equivalent circle diameter when observed in a surface layer plane direction, the Si particles being particles consisting of Si or particles made of a compound primarily containing Fe and Si.

10. A brazing sheet, having a multilayer structure, wherein at least one layer of the aluminum alloy according to claim 1 is laminated,
wherein at least one of the at least one laver is an outermost layer of the multilayer structure, and
the outermost layer has, an Al—Si-based brazing material laminated on one surface thereof.

11. The brazing sheet for brazing according to claim 10, wherein
the Al—Si-based brazing material comprises, by mass %, Si: 1.5% to 14%, and further comprises one or more of Mg: 0.01% to 2.0% and Bi: 0.005% to 1.5%.

12. The aluminum brazing sheet according to claim 11, wherein
in the Al—Si-based brazing material, an area ratio of Si particles having a diameter of 1.75 µm or more in terms of equivalent circle diameter with respect to a surface area is in a range of 0.1% to 1.5%, the Si particles being particles consisting of Si or particles made of a compound primarily containing Fe and Si.

13. The aluminum brazing sheet according to claim 11, wherein
in the Al—Si-based brazing material, a number of Si particles having a diameter of 1.75 µm or more in terms of equivalent circle diameter is 25% or more with respect to a number of the Si particles having a diameter of 0.8 µm or more in terms of equivalent circle diameter when observed in a surface layer plane direction, the Si particles being particles consisting of Si or particles made of a compound primarily containing Fe and Si.

14. The aluminum brazing sheet according to claim 11, wherein
in the Al—Si-based brazing material, an area ratio of Si particles having a diameter of 1.75 µm or more in terms of equivalent circle diameter with respect to a surface area is in a range of 0.1% to 1.5%, the Si particles being particles consisting of Si or particles made of a compound primarily containing Fe and Si.

15. The brazing sheet for brazing according to claim 10, wherein
the Al—Si-based brazing material further comprises 0.1% to 9.0% of Zn by mass %.

16. The aluminum brazing sheet according to claim 10, wherein
in the Al—Si-based brazing material, a number of Si particles having a diameter of 1.75 µm or more in terms of equivalent circle diameter is 25% or more with respect to a number of Si particles having a diameter of 0.8 µm or more in terms of equivalent circle diameter when observed in a surface layer plane direction, the Si particles being particles consisting of Si or particles made of a compound primarily containing Fe and Si.

17. The aluminum brazing sheet according to claim 10, wherein
in the Al—Si-based brazing material, an area ratio of Si particles having a diameter of 1.75 µm or more in terms of equivalent circle diameter with respect to a surface area is in a range of from 0.1% to 1.5%, the Si particles being particles consisting of Si or particles made of a compound primarily containing Fe and Si.

* * * * *